United States Patent [19]

Ploeg et al.

[11] Patent Number: 4,836,709

[45] Date of Patent: Jun. 6, 1989

[54] WATER WAVE ABSORBER

[75] Inventors: Jozinus Ploeg, Gloucester; Wayne W. Jamieson, Ottawa, both of Canada

[73] Assignee: Canadian Patents and Development Limited, Ontario, Canada

[21] Appl. No.: 61,560

[22] Filed: Jun. 15, 1987

[51] Int. Cl.⁴ .................................................. E02B 3/06
[52] U.S. Cl. ........................................ 405/31; 405/30; 405/27
[58] Field of Search ................... 405/15, 16, 21, 23, 405/25-35

[56] References Cited

U.S. PATENT DOCUMENTS

| | | | |
|---|---|---|---|
| 1,432,530 | 10/1922 | Chance | 405/27 |
| 3,118,282 | 1/1964 | Jarlan . | |
| 3,188,813 | 6/1965 | Foster | 405/27 |
| 3,387,458 | 6/1968 | Jarlan . | |
| 3,487,645 | 1/1970 | Frankel | 405/26 |
| 3,513,797 | 5/1970 | Frankel | 405/30 X |
| 3,858,402 | 1/1975 | Baker et al. . | |
| 3,878,684 | 4/1975 | Lamy | 405/31 |
| 3,886,753 | 6/1975 | Birdy et al. . | |
| 3,921,408 | 11/1975 | Lamy . | |
| 4,014,177 | 3/1977 | Jarlan . | |
| 4,154,548 | 5/1979 | Ijima | 405/30 |
| 4,388,019 | 6/1983 | Kajihara . | |
| 4,468,151 | 8/1984 | Warlick . | |
| 4,483,640 | 11/1984 | Berger et al. | 405/30 X |
| 4,710,057 | 1/1987 | Laier | 405/30 |
| 4,764,052 | 8/1988 | Jarlan | 405/31 |

FOREIGN PATENT DOCUMENTS

| | | | |
|---|---|---|---|
| 407575 | 3/1910 | France | 405/30 |
| 730189 | 8/1932 | France | 405/30 |
| 726859 | 3/1955 | United Kingdom | 405/30 |

OTHER PUBLICATIONS

Funke et al., "An Introduction to GEDAP—An Integrated Software System for Experimental Control...", (1980).

Funke et al., "The NRCC 'Random' Wave Generation Package", National Research Council of Canada, (1984).

Jarlan, "A Perforated Vertical Wall Breakwater", The Dock and Harbour Authority, vol. XLI, No. 486, Apr., pp. 394-398, (1961).

Kondo, "Analysis of Breakwaters Having Two Porous Walls", Proc. Coastal Structures '79 Conference, Alex., Va., Mar., pp. 962-977, (1979).

Lean, "A Simplified Theory of Permeable Wave Absorbers", Journal of Hydraulic Research, IAHR, vol. 5, No. 1, pp. 15-30, (1967).

Le Mehaute, "Progressive Wave Absorber", Journal of Hydraulic Research, IAHR, vol. 10, No. 2, pp. 153-169, (1972).

Madsen, "Wave Reflection from a Vertical Permeable Wave Absorber", Coastal Engineering, vol. 7, pp. 381-396, (1983).

Mansard et al., "The Measurement of Incident and Reflected Spectra . . . A Least Squares Method", . . . Vol. 1, pp. 154-172, (1980).

Mansard et al., "Reflection Analysis of Non-Linear Regular Waves", National Research Council of Canada . . . TR-HY-011, (1985).

Mansard et al., "On the Reflection Analysis of Irregular Waves", TR-HY-017, (1987).

Ouellet et al., "A Survey of Wave Absorbers", Journal of Hydraulic Research, IAHR, vol. 24, No. 4, pp. 265-280, (1986).

Weckmann et al., "Reflection Characteristics of a Wave-Absorbing Pier", Proc. Coastal Structures '83 Conf., . . . Mar., pp. 953-960, (1983).

Jamieson et al., "An Efficient Upright Wave Absorber", National Research Council of Canada, Hydraulics Laboratory Technical Report, (1987).

Goda et al., "Theoretical and Experimental Investigation of Wave Energy . . . Mesh Screens", Mass. Inst. of Tech., . . . (1963).

Dramex Expanded Metals Catalog, (Aug. 1986).

Primary Examiner—Dennis L. Taylor
Assistant Examiner—John A. Ricci
Attorney, Agent, or Firm—Burns, Doane, Swecker & Mathis

[57] ABSTRACT

There is described a water wave absorber, particularly suitable for use in testing tanks, to reduce the reflection of generated waves. The absorber comprises a series of sheets of unflattened expanded material, usually metal, positioned one behind the other and the sheets being arranged in generally decreasing porosity from the front of the wave absorber to the rear thereof.

17 Claims, 8 Drawing Sheets

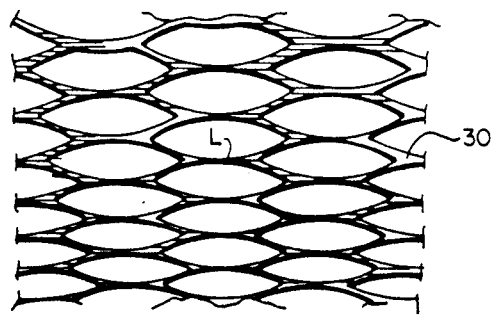
FIG. 1A
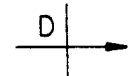
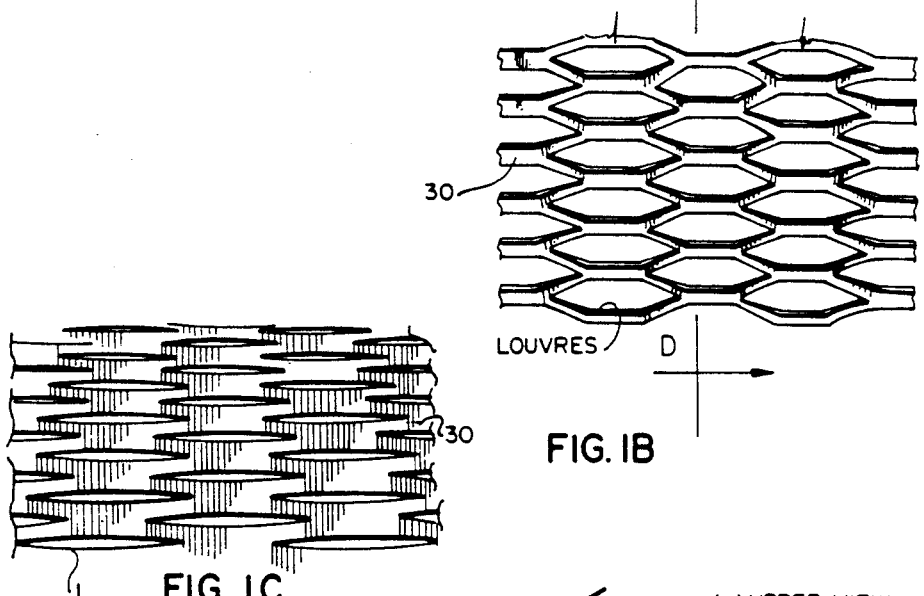
FIG. 1B
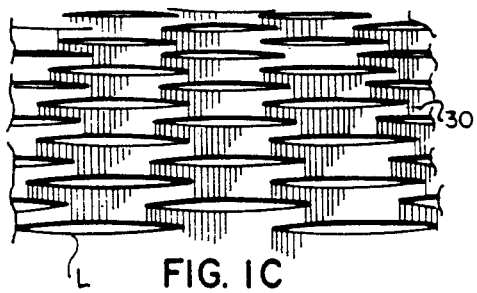
FIG. 1C
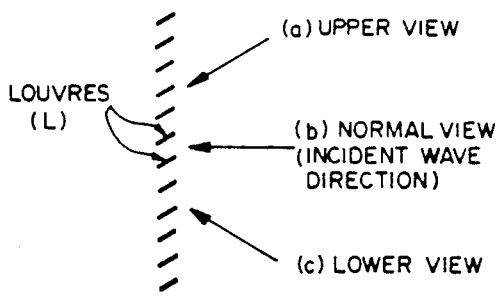
FIG. 1D

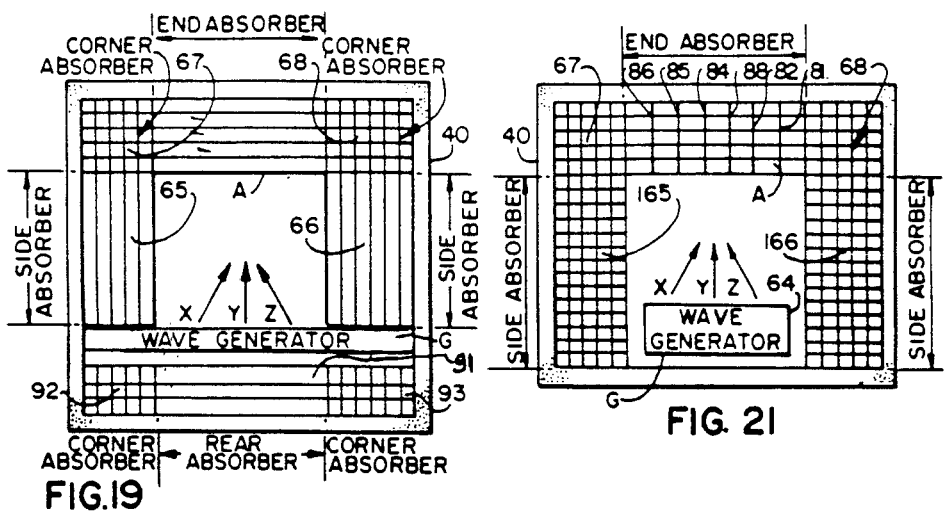
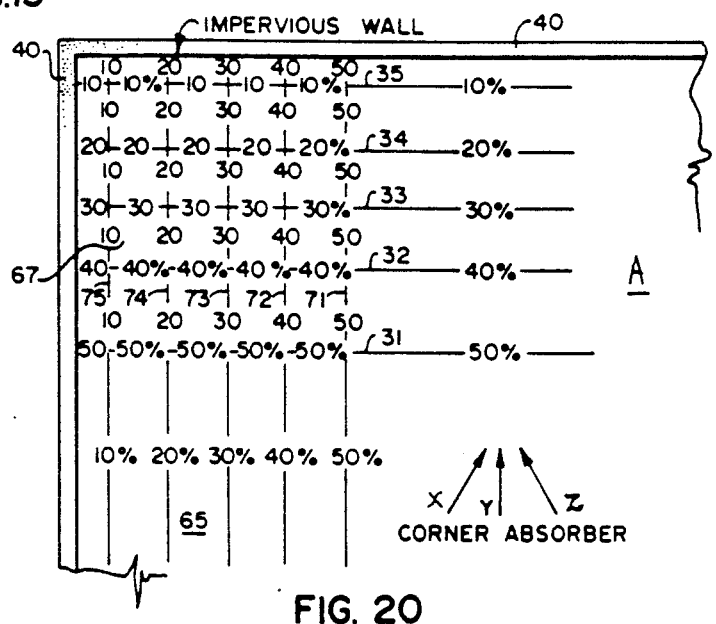

WATER WAVE ABSORBER

Background of the Invention

The present invention relates to a water wave absorber and has particular but not exclusive application to laboratory wave tanks where the space available for the installation of wave absorbers is limited. Such laboratory wave tanks also generally require that testing be carried out in variable water depths without having to make major adjustments to the absorber and reflected wave energy from the absorber must be minimized for a wide range of water depths, wave heights and wave periods.

In laboratory wave tanks used for the modelling of coastal and offshore structures, incident waves generated by a wave generator must simulate open ocean conditions as realistically as possible. This requires the installation of wave absorbers capable of providing adequate energy dissipation; otherwise, waves reflecting off the absorber will propagate back to the test location causing erroneous results. It is generally accepted that the reflection coefficient ($C_r$) defined as the ratio of reflected wave height to incident wave height (expressed as a percentage) should be consistently less than 10% and preferably less than 5%, for all wave conditions that are to be simulated in the laboratory.

The most commonly used wave absorbers are beaches of constant slope which extend to the bottom and may be constructed of concrete, sand, gravel or stones. However, other designs include the use of transverse bars, solid or perforated plates, wire mesh or fibrous materials. In order to obtain good dissipation of wave energy, the slope of these beaches has to be mild, usually less than 1:10. This results in using up valuable tank space, particularly with increasing water depths. To reduce the length of these beaches, a beach with a variable slope can be installed. A parabolic slope is often used in conjunction with surface roughness and porous materials; however, the position of the parabolic profile relative to still water level has to be adjusted and optimized each time the water depth is changed.

The concept of a progressive wave absorber (one in which the porosity decreases towards the rear of the absorber) that could be effective in dissipating wave energy over a short distance has been presented. A theory was developed on progressive wave absorption and some small scale tests were carried out on a progressive wave absorber constructed of aluminum shavings which became more compacted (less porous) in the direction of propagation of the incident waves. Relatively low reflection coefficients were measured and the test results seemed to substantiate qualitatively the basic principle on which the progressive wave absorption theory is based. However, the use of aluminum shavings for a permanent wave absorber installation should be avoided. With time, the compaction of the shavings change and the overall efficiency of the absorber is affected.

In open water situations (as against test tank situations), an upright caisson breakwater, having a perforated wall in front of an impervious back wall, is occasionally used to reduce the high reflections associated with solid wall breakwaters. It has been shown analytically and experimentally that considerably lower reflections over a wider range of wave periods are possible when two or three perforated walls are used instead of a single perforated wall. For varying wave periods, the reflection coefficients for a single perforated wall can vary from approximately 10% to 80%, while the two and three perforated wall configurations generally can be designed to have lower reflection coefficients ranging from 10% to 50%. Although these reflections may be acceptable for many open water situations, none of the above configurations provides sufficiently low reflections for laboratory use.

SUMMARY OF THE INVENTION

According to the present invention there is provided a water wave absorption device comprising a plurality of absorption elements each formed from at least one sheet of unflattened expanded material having louvred apertures, the elements being positioned one behind the other in spaced relationship and arranged in generally decreasing porosity from the front to the rear of the device. This device provides wave reflection coefficients less than 5%.

In a preferred form of the invention, the louvred apertures are oriented with the louvres directed upwardly and forwardly in each sheet.

The invention has been found to be particularly efficacious when the device is located in front of an impervious wall.

According to one preferred form of the invention each element comprises a plurality of sheets arranged substantially end to end and the sheets in each element are arranged generally parallel to corresponding sheets in the next adjacent element.

Certain advantageous results can be obtained, according to the invention, by providing elements with generally decreasing porosity from the top to the bottom.

According to one preferred feature of the invention the spacing between successive elements generally decreases from the front to the rear of the device.

Ideally, some of the elements are essentially vertical although it is not necessary in all instances that all elements be vertical.

The elements may be covered with a sloping or curved cover member extending upwardly towards the rear of the device and the vertical heights of at least some of the essentially vertical elements, preferably increase from the front to the rear of the device. When the device is located in a laboratory tank, means (such as a hoist) may be provided to adjust the vertical position of the wave absorption device in the tank with respect to the bottom thereof.

In the situation where the cover member extends upwardly from the bottom towards the rear of the device, the cover member is made porous.

The elements themselves may be arranged in a zigzag configuration when viewed in plan.

According to another feature of the invention, floatation means may be provided for the wave absorption device and means may be provided for mooring the device in a floating condition.

According to another feature of the invention, a plurality of secondary elements each formed from at least one sheet of unflattened expanded material having louvred apertures, are arranged substantially perpendicular to and between at least some of the elements.

Preferably the lower porosity elements near the rear of the device are located in the vicinity of the wave nodal points, substantially one quarter of the wave lengths in front of the impervious wall for the waves that are to be absorbed.

The invention further provides that the spacing between and behind elements of higher porosity is greater than the spacing between and behind elements of lower porosity.

According to a preferred feature, the distance from front to rear of the device is from about $0.35L_{max}$ to $1.0 L_{max}$, where $L_{max}$ is the length of the longest wave that must be effectively absorbed in the tank.

By making the absorption elements from a sheet or sheets of unflattened expanded material a great flexibility is imparted to the device. It is readily assembled and disassembled, it lends itself to ready alteration of configuration, increases or decreases of size, ready alteration and selection of porosity and is particularly suited for laboratory tank purposes where it can be built in modules that can easily be moved. Furthermore, it is strong, durable, light weight, portable, and clean when compared with stone beaches and maintains the same characteristics for a long time. More importantly, it produces an extremely efficient level of wave absorption. The sharp edges encourage flow separation resulting in turbulence and energy dissipation.

A particularly efficacious arrangement is obtained when the louvred apertures of the sheets are oriented with the louvres directed upwardly and forwardly in each sheet into the direction of wave propagation of the incident waves.

The unflattened expanded material sheets are preferably metal sheets of the type manufactured by Expanded Metal Corporation, 20 Fasken Drive, Rexdale, Ontario, Canada.

DESCRIPTION OF THE DRAWINGS

The following is a description by way of example of certain embodiments of the present invention reference being had to the accompanying drawings in which:

FIGS. 1a, 1b and 1c, are front views of a sheet of unflattened expanded metal having louvred apertures looking in the direction of arrows a, b and c respectively as seen in FIG. 1d, which itself is a cross-section on the line d—d in FIG. 1b;

FIG. 19 is a schematic plan view of a tank with end, rear, corner, and side, wave absorbing devices;

FIG. 20 is a detail of a corner wave absorbing device unit;

FIG. 21 is a schematic plan view with secondary wave absorbing elements provided at right angles in the end and side wave absorbing devices.

DESCRIPTION OF THE PREFERRED EMBODIMENTS

Turning now to the drawings.

FIG. 1 shows metal sheets 30, which had been slit and expanded (drawn). For use in laboratory wave tanks hot dipped galvanized steel (1.2 mm to 1.5 mm thick) or aluminum expanded metal sheets (1.6 mm to 3.2 mm thick) have been found suitable. In open water situations metal sheets up to about 6.4 mm thick may be used. This type of perforated sheet is known as unflattened expanded metal. The slitting and expanding process provides each sheet with a louvred design, which is very rigid. FIGS. 1a to 1c show three views of an expanded metal sheet 30 designated as having a porosity of 50% where porosity (n) is defined as the ratio of open area to total area expressed as a percentage. The arrows a, b and c in FIG. 1d show the viewing angles that are used for FIGS. 1a, 1b and 1c respectively when the louvres L in the expanded metal sheet are directed upwards into the direction of wave propagation of the incident waves. In FIG. 1a the porosity is considerably greater than 50%. For the normal view FIG. 1b corresponding to the direction of the incident waves, the porosity is approximately 50%; however, for FIG. 1c the porosity is substantially less than 50%. These drawings illustrate how the porosity of expanded metal sheets is somewhat progressive, that is, as the viewing angle shown in FIG. 1 changes from 1a to 1c there is a progressive decrease in porosity because of the louvred design. Sheets ranging in porosity from 5% to 85% in 5% increments may be used. Similar to FIG. 1b, each of the designated porosities correspond to the approximate porosity when viewed normal to the sheet. Although hot dipped galvanized steel or aluminum is the preferred material used in test tanks, it is to be understood that the term unflattened expanded material as used hereinafter and in the claims is also intended to embrace other suitable materials such as plastics, stainless steel and alloys such as copper and nickel.

Figure 2:
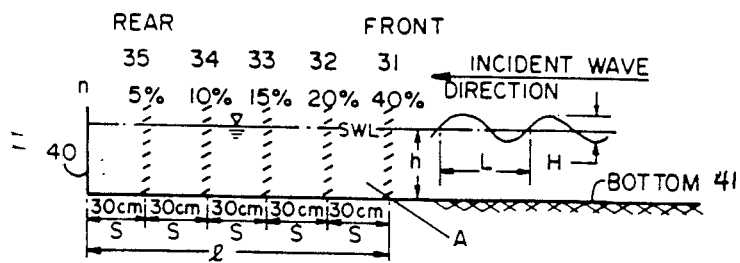
FIG. 2 is a schematic side elevation representation of a device according to the invention, set-up as an upright wave absorption device arranged in front of an impervious wall.

Turning to FIG. 2, the different symbols used therein are described here under, as are other terms used hereinafter in the application.

Figure 3:
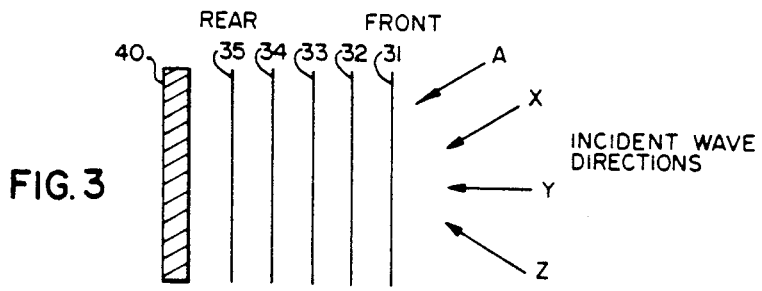
FIG. 3 is a schematic plan view of the device seen in FIG. 2 showing that incident water waves may approach the front of the device from various arbitrary directions; here wave absorption elements are depicted as single sheet elements.
Figure 14:
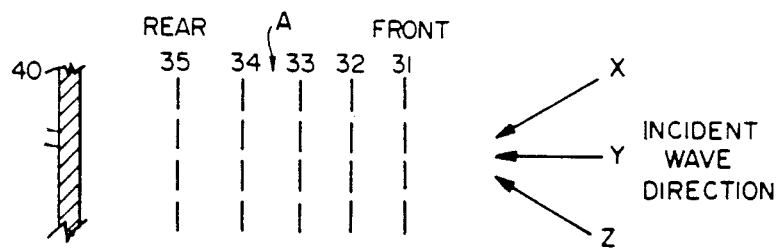
FIG. 14 is a schematic plan view in which the elements are multi sheet arranged parallel to each other with a small gap being provided between individual sheets forming the elements.
Figure 15:
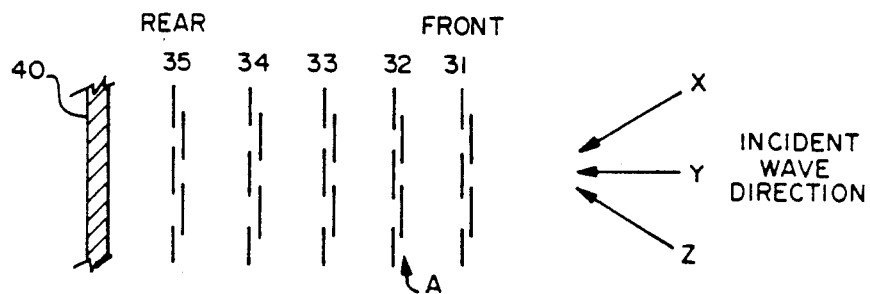
FIG. 15 is a view similar to FIG. 14 in which the sheets forming the elements, while substantially being arranged in end to end relationship, are permitted to overlap slightly.
Figure 16:
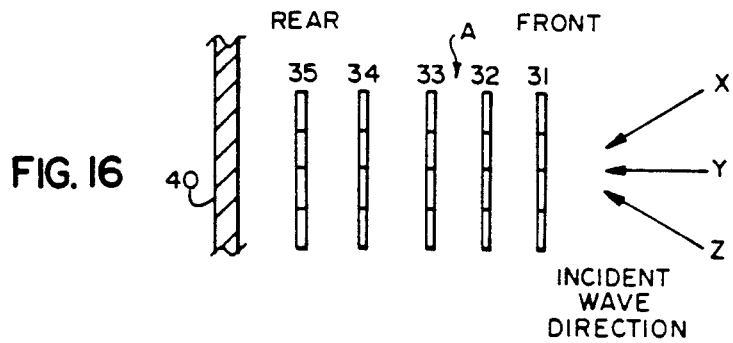
FIG. 16 is a schematic plan view similar to FIGS. 14 and 15 in which the sheets of the elements are completely aligned and essentially abut each other.

$C_r$ = Reflection coefficient, $H_r/H_i$
h = Water depth
$H_i$ = Incident wave height
$H_r$ = Reflected wave height
l = Length of wave absorber device
L = Wave length (Airy wave theory)
m = Number of elements in a given wave absorber device
n = Porosity of element (sheet) viewed normal to element (sheet)
s = Spacing between and behind elements
T = Wave period
h/L = Relative water depth
$H_i/L$ = Incident wave steepness
l/L = Relative length of wave absorber device
SWL = Still water level In FIGS. 2, 3, 14, 15 and 16 there is shown a water wave absorption device A comprising a plurality of absorption elements 31, 32, 33, 34 and 35, each of which in FIG. 2 comprises a single sheet 30 of unflattened expanded material having louvred apertures L and each of which, in FIGS. 14, 15 and 16, comprises a plurality of sheets 30 arranged end to end to form a row with the sheets in each row being arranged generally parallel to the corresponding sheet in the next adjacent row. In FIG. 16 the sheets 30 in each row abut each other, in FIG. 14 they are spaced apart very slightly and in FIG. 15, they slightly overlap each other but can be said to be generally in end to end relationship. If desired the absorption elements could be mounted in modules with spaced and overlap combinations of sheets. The rows of sheets are mounted on support frames (not shown) which conveniently may comprise metal piping in a scaffold-like structure, which is highly transparent to wave motion. The absorption device A is shown arranged in a laboratory test tank having an impervious rear wall 40 and a tank bottom 41. The absorption elements 31 through 35 are arranged in generally decreasing porosity from the front to the rear of the device with typical porosities being 40% for element 31, 20% for element 32, 15% for element 33, 10% for element 34 and 5% for element 35. Element 35, the rearmost element in the device (as shown) is located in the vicinity of the wave nodal points, substantially one quarter of the wave lengths in front of the wall 40 for shorter waves that are to be absorbed. In FIG. 3 it will be seen that the incident waves may be incident on the front of the wave absorber from various arbitrary directions (for example x, y and z).

Tests on an upright wave absorber (or wave absorption device) such as seen in FIG. 2 show that the alignment of the louvres L in the sheets 30 making up the absorption elements affects the performance of the upright wave absorber of FIG. 2. By far the best overall results (lowest reflection coefficients) were obtained with the louvres in each sheet directed upwards into the direction of wave propagation of the incident waves. Tests conducted with the louvres directed upwards, often resulted in reflection coefficients that were less than half of those measured with the louvres directed downwards.

Also the tests showed that the efficiency of the upright wave absorber was improved by making the framework constituting the supporting structure for the absorption elements as transparent as possible to wave propagation.

Tests have also shown that a constant porosity absorber device with elements made from low porosity sheets (n=15%) is most effective in absorbing the wave energy associated with low steepness waves ($H_i/L=0.01$), while an absorber with elements made from higher porosity sheets (n=30%) is most effective in dissipating the wave energy related to higher steepness waves ($H_i/L=0.04$). In general, a constant porosity wave absorber is only effective in dissipating wave energy over a narrow range of wave steepnesses depending on the specific porosity used. For example, an absorber with five 30% elements had a relatively low reflection coefficient of 6% for $H_i/L=0.04$; however, for a wave steepness of $H_i/L=0.01$, the reflection coefficient rose to 41%. A numerical short-wave model and a simple theoretical solution have shown similar trends for wave absorbers with constant porosity.

The performance of an upright wave absorber with constant porosity is improved significantly when the porosity of the elements is progressively decreased towards the rear of the absorber. The higher porosity elements at the front of the absorber provide optimum energy dissipation of the higher waves. Low porosity elements near the front would cause excessive reflection of high waves. The low waves pass quite freely through the high porosity elements and are eventually attenuated by the low porosity elements located near the rear of the absorber.

A high wave entering an efficient progressive wave absorber undergoes successive stages of wave attenuation as lower and lower porosity elements are encountered which are progressively more efficient in dissipating the energy associated with the decreasing wave heights. Each element dissipates part of the incident wave energy, while the balance is divided between reflected and transmitted energy. Multiple reflections between the elements causes further energy dissipation.

For wave steepnesses ranging from 0.02 to 0.07, tank tests indicated a strong oscillation of the reflection coefficient, for increasing relative lengths of the wave absorber. It is evident that the length of the wave absorber (l) should be at least 35% of the wave length (l/L=0.35); otherwise, high reflections could result. When the length of the wave absorption device exceeds the length of the wave (l/L>1), the oscillating nature of the reflection coefficient reduces significantly; however, some reflection still occurs, even as the absorber becomes very long (l/L=2.0 to 2.9). In general terms, the experimental results indicate that a longer absorber does not necessarily absorb more energy than a shorter one for wave steepnesses between 0.02 and 0.07. Generally if low reflection coefficients are essential over a wide range of wave steepnesses, (including wave steepnesses less than 0.02 and greater than 0.07) a wave absorber longer than the minimum length of 0.35 L is required in order to accommodate more elements of suitable porosity which are effectively located within the absorption device.

Test results show that the amount of energy dissipation is dependent upon the location of each element with respect to the locations of the nodes and antinodes in the standing wave system set-up within the absorber. The predominant vertical water particle motion that can develop near the antinodes renders the elements placed in the vicinity of the antinodes ineffective in providing energy dissipation. It was found that essentially no changes in the reflection coefficient resulted with the removal of these elements. However, elements placed in the vicinity of the nodes (regions of predominant horizontal water particle motion) were found to be effective in attenuating wave energy. The experimental results clearly illustrate that for effective attenuation of the low wave heights, it is desirable not to locate the absorption elements of low porosity too close to the antinode at an impervious wall located at the rear of the absorber. To be effective these elements have to be located in the vicinity of the nodal points, approximately one quarter of the wave lengths in front of the impervious wall.

It was found that in general terms, the wider the range of wave heights and wave periods (in regular and irregular wave trains) that must be attenuated, the greater the number of variable porosity elements 30 that are required. Normally, a length of absorber equivalent to the length of the longest wave to be effectively absorbed in a wave tank ($l/L_{max}=1.0$) has been found to be sufficient to accommodate the required number of elements to minimize the reflection coefficients ($C_r$ less than 5%) over a wide range of water depths, wave heights and wave periods.

It was found that the waves should have sufficient space for energy dissipation by turbulence before another element is encountered; otherwise, excessive reflection may result. For very efficient operation, it is important to have a wide spacing of the elements at the front of the absorber for the case of high wave heights and long wave periods for a given water depth (high $H_i/L$ and low $h/L$) where large horizontal displacements of water particle motions are experienced throughout the water depth. As the wave height and corresponding horizontal displacements of water particle motions decrease with distance into the absorber, a closer spacing of the elements can be used to optimize energy dissipation by the increased turbulence of additional elements. The most efficient absorber is considered to be one with progressively decreasing spacing between the elements as well as decreasing porosity of the elements from the front to the rear of the absorber.

In a water depth of 1.8 m a wide spacing (s=50 cm) of the high porosity elements (n=55% to 65%) near the front of an experimental absorber were effective in dissipating the wave energy associated with high waves ($H_i$=50 cm to 64 cm) and long wave periods (for example T=2.86 sec corresponding to a wave length, L=10.22 m). A narrower spacing (s=25 cm) of the lower porosity elements towards the rear of the absorber provided adequate energy dissipation for the lower wave heights. The number of elements (m=20) depended on the length of the absorber device (l=6.25 m) and the spacing between and behind the elements (s=25 cm and 50 cm).

Figure 4:
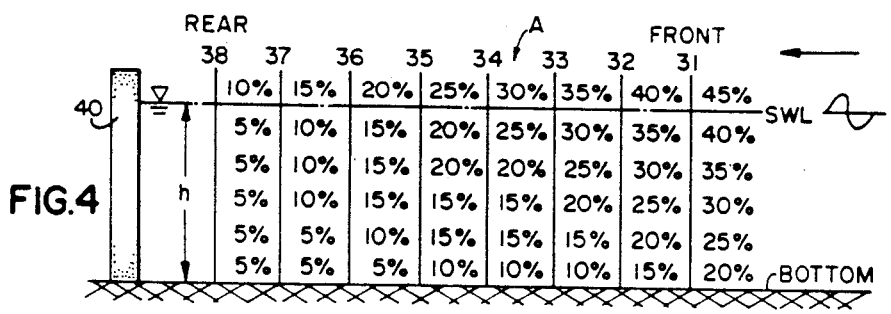
FIG. 4 is a schematic side elevation of a device with a form of wave absorption elements not shown in the other drawings herein, the porosity of each element generally decreasing from the top to the bottom.

Turning now to FIG. 4, here the wave absorption device A is shown to have eight absorption elements each made up from rows of sheets which themselves are not of uniform porosity throughout. These sheets are manufactured by the aforementioned Expanded Metal Corporation, and are made so that they have a generally decreasing porosity from the top to the bottom of the sheet. Typical porosities are indicated on FIG. 4 for rows 31 through 38. Ideally, the porosity of each sheet forming each element is the same as that of every other sheet in that element. Typical values may in the case of element 31 vary from 45% near the surface through 40% through 35%, 30%, 25% to 20% near the bottom.

This type of variation in porosity throughout the height of the elements provides a very efficient wave absorption device where deep water waves must be dissipated.

Figure 5:
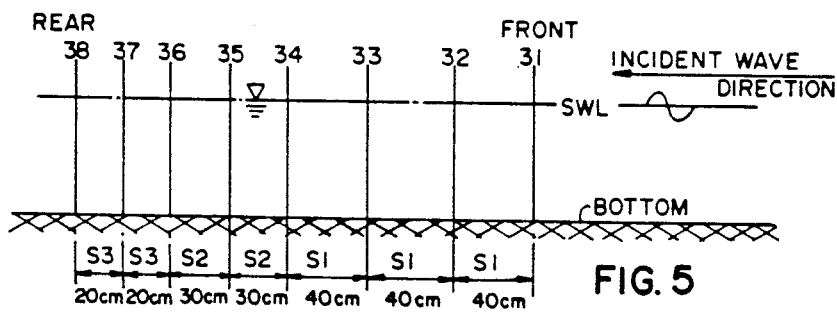
FIG. 5 is a schematic side elevation showing an arrangement in which the spacing between successive elements generally decreases from the front to the rear of the device.

In FIG. 5, the device is shown with elements of constant porosity throughout their heights, which elements are arranged with the spacing $s_1$ between and behind the higher porosity elements 31, 32, 33, say 45% each, being greater than the spacing $s_2$ between and behind lower porosity elements 34, 35, say 35% and the spacing $s_3$ between and behind still lower porosity elements 36, 37, 3S, say 25%, being less than the spacing $s_2$. Indeed in the optimum form, the distances between individual elements decreases progressively from the front to the rear of the device in a fashion to match the decreasing porosity of the individual elements. FIG. 5 also illustrates that the present invention includes constructions in which each successive element need not be of lower porosity than the immediately preceding element, only that the porosity generally decreases from front to back.

Figure 6:
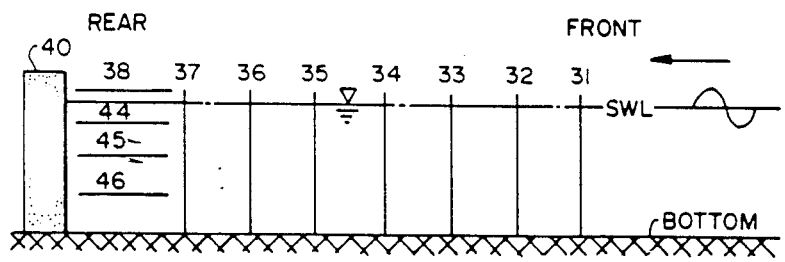
FIG. 6 shows an alternative configuration in which the upright elements are followed by some horizontally arranged elements.

FIG. 6 shows an alternative construction in which the front part of the device is arranged in an upright fashion, that is to say elements 31 through 37 are as hereinbefore whereas elements 38, 44, 45 and 46 are arranged at right angles to the vertical elements 31 through 37.

Figure 7:
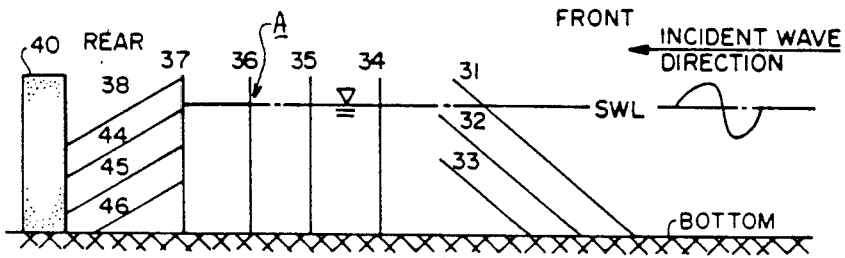
FIG. 7 is a schematic side elevation with fewer upright elements than in FIG. 6 and some inclined elements positioned in front of and behind the essentially vertical elements.

In FIG. 7 yet another form of absorber A is shown in which elements 34, 35, 36 and 37 are upright, and elements 31, 32, 33, at the front of the device are inclined and elements 38, 44, 45 and 46 at the rear of the device are also inclined.

Figure 8:
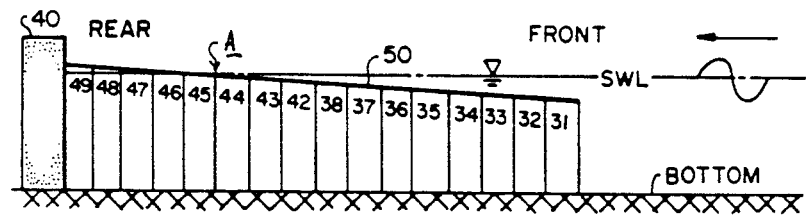
FIG. 8 is a schematic side elevation in which a large number of elements are provided and in which the vertical height of successive elements are generally increased from the front to the rear, and in which the device is provided with a cover.

In FIG. 8 there is shown another form of a vertical water wave absorption device A in which the absorption elements 31 through 49 are vertical but of different height and in which a cover member 50 covers the top of the wave absorption device. The cover member may itself be porous or have a roughened surface.

Figure 9:
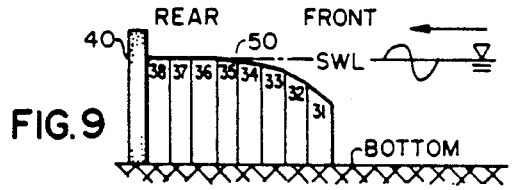
FIG. 9 is a schematic side elevation of a device in which the cover is parabolic in nature.

FIG. 9 shows an alternative configuration in which the cover means 50 is parabolic in configuration and the height of the absorption elements selected accordingly.

Figure 10:
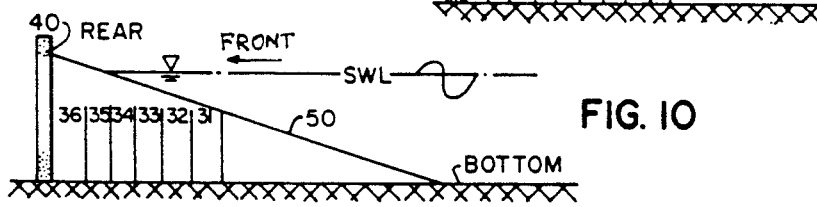
FIG. 10 is a schematic side elevation of a device in which the cover extends from the bottom, and is porous and in which the elements are of generally uniform height.

FIG. 10 shows yet an alternative arrangement in which elements 31 through 36 are of equal height and the cover member 50 extends upwardly from the bottom towards the rear. In this instance because the elements would otherwise not be exposed to wave activity, the cover member of the device 50 is made porous.

Figure 11:
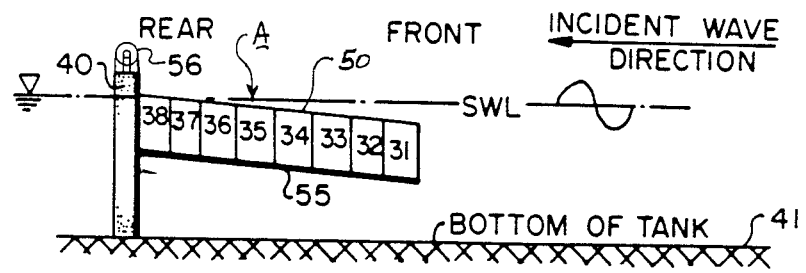
FIG. 11 is a schematic side elevation in which the wave absorption device is modular in nature and is height adjustable within a tank.

In FIG. 11 the wave absorption device A is made modular in configuration being connected by a bottom structure 55 as well as the cover member 50. Any suitable lifting devices, for example a hoist, schematically indicated at 56, on the rear wall 40 are capable of moving the wave absorption device up and down within the tank to allow the device to be optimally positioned relative to the still water level for different water depths in the tank.

Figure 12:
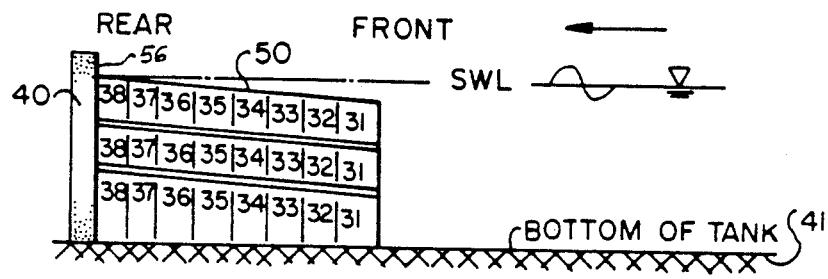
FIG. 12 is a schematic side elevation in which three height adjustable modules such as seen in FIG. 11 are employed, one on top of another, the top module being covered with a covering means.

In FIG. 12, three modular units similar to that shown in FIG. 11 are arranged one on top of each other with a cover over only the uppermost modular unit.

Figure 13:
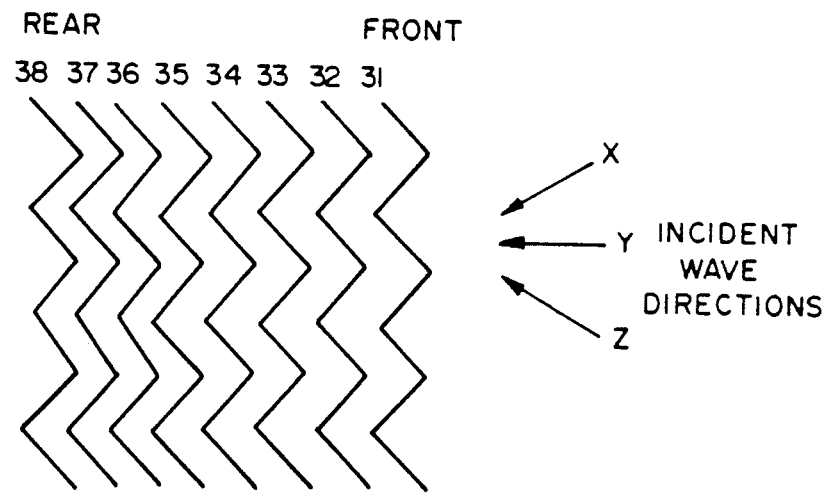
FIG. 13 is a schematic plan view showing multi sheet elements arranged in zig-zag formation.

FIG. 13 is a plan view similar to FIGS. 14, 15 and 16 but here the elements 31 through 38 are arranged in zig-zag configuration. By arranging the elements in zig-zag configuration, energy dissipation is provided between the parallel sheets and the build up of cross waves is minimized.

Figure 17:
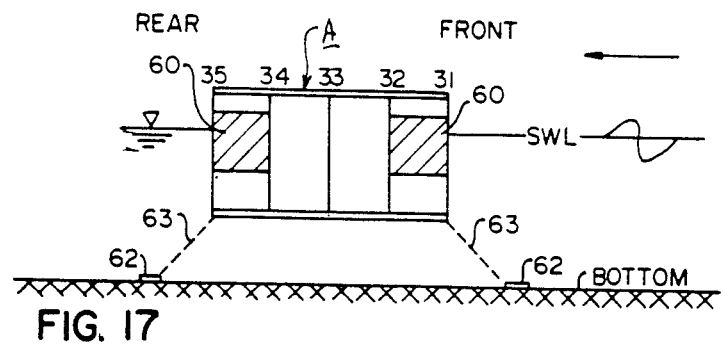
FIG. 17 is a schematic side elevation of an alternative construction in which the wave absorption device is provided with floatation means so that it floats in open water situations and is provided with anchors.
Figure 18:
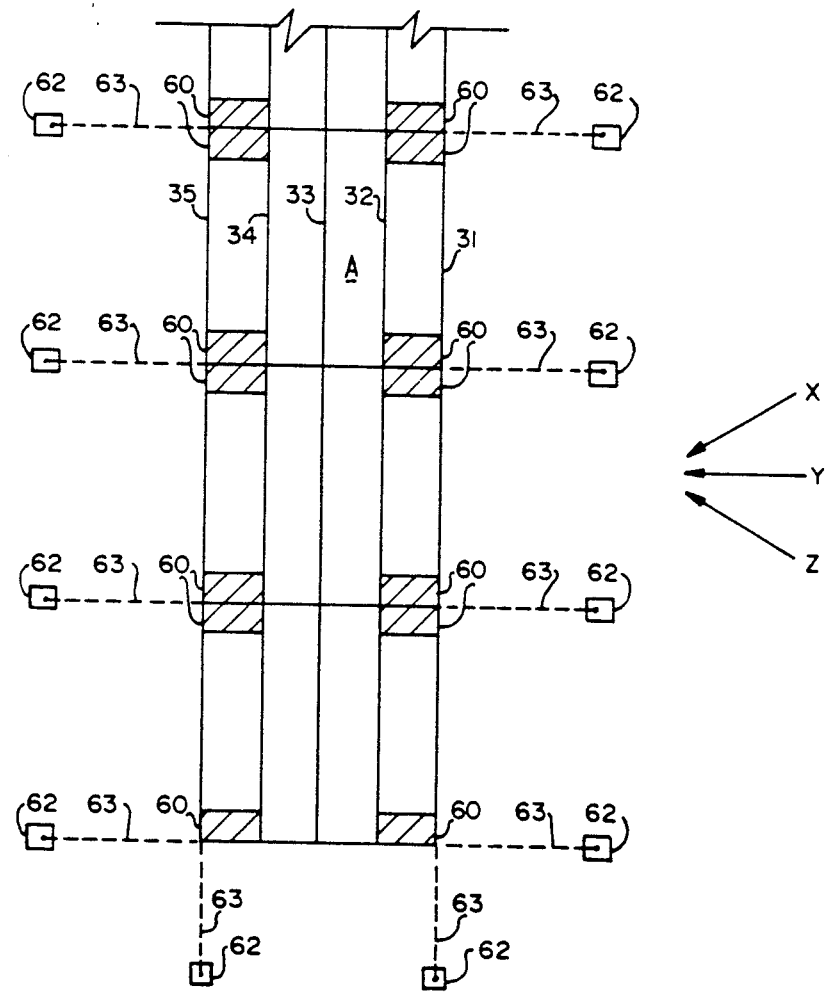
FIG. 18 is a schematic plan view of the device shown in FIG. 17.

FIGS. 17 and 18 are a side elevation and plan view respectively of the water wave absorption device A, again arranged in modular form, but this time provided with floatation devices 60, anchors 62 and anchor chains 63. This type of device is particularly suitable for use in a lake, sheltered bay, river or otherwise where it can provide a defence against damage by wave action.

FIGS. 19 and 21 show structures in a test tank in which an upright water wave absorption unit A at one end of the tank opposite a wave generator G is flanked by two, similar construction, side wave absorption devices 65, 66 (165, 166). In each instance the tank corners, between the end absorber device A and side absorber devices 65, 66 (165, 166) is filled by an upright corner absorber unit 67, 68, details of which are shown enlarged in FIG. 20. In order to attenuate waves that may build up in the corners and propagate as cross waves in the end and side absorbers A, 65, 66, (165, 166), secondary elements 71, 72, 73, etc., (FIG. 20), in the configuration shown made up of sheets of unflattened expanded material having louvred apertures, exactly the same as is used in the elements of the end and side absorber devices, are interposed perpendicularly to and between the primary elements 31, 32, etc. which extend outwardly from the end absorber device A. Sample porosity values (for the secondary elements 71, 72, 73 etc.) are shown in FIG. 20 and correspond generally to the porosity values of the primary elements in the side absorber device 65.

Figure 22:
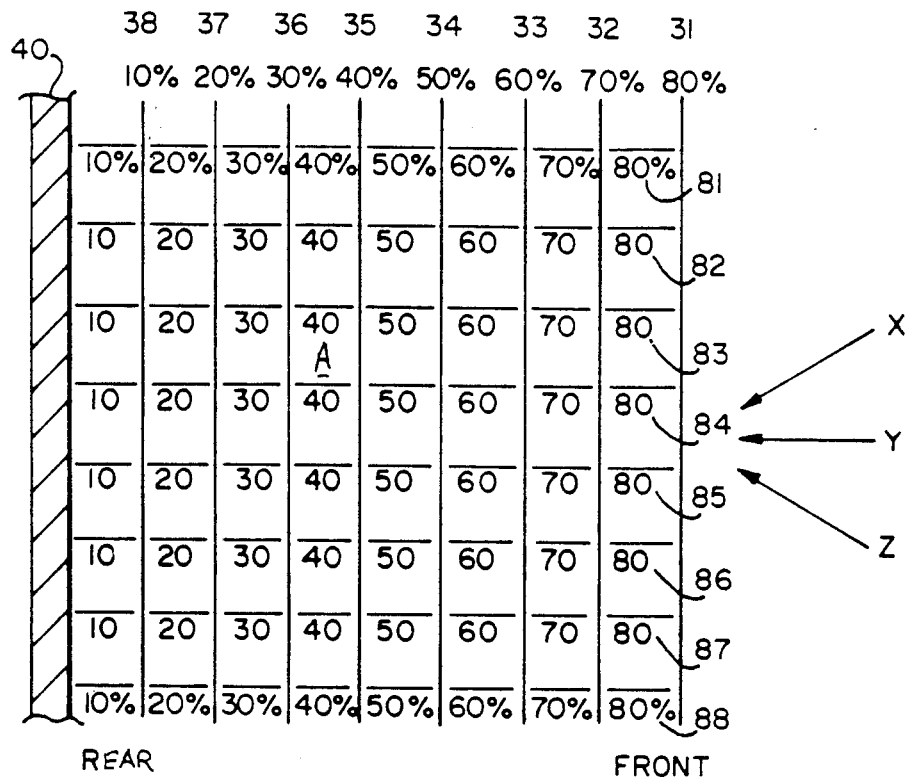
FIG. 22 is a detail of the end or side absorbing device with secondary absorbing elements.

In FIG. 21, the end wave absorption device A is provided with secondary elements 81, 82, 83, etc., as are the corner absorbers and the side absorbers. Typical porosity for the secondary elements in the end and side absorbers are shown in FIG. 22. By providing energy dissipation between the long straight open chambers between the primary parallel elements, these secondary elements help to minimize the build up of cross waves.

For wet back wave generators, where water in the test tank is behind the wave generating boards as well as in front of them, a short upright rear wave absorber 91, and corner absorbers 92 and 93 similar to the end absorber A and the corner absorbers 67 and 68 (see FIG. 19) may be provided behind the wave generator G. These absorbers 91, 92, 93 constructed of unflattened expanded material as before can be effective in attenuating the waves generated behind the wave generator G and thus preventing the build up of waves that might otherwise overtop the rear wall of the tank or reflect back to the wave generator G causing excessive wave pressures on its wave boards. Alternatively the rear absorber 91 may extend the full width of the tank.

Although not illustrated, it will be understood that side absorbers with or without corner absorbers could be used in a long tank or flume. Side absorbers are effective in dissipating wave energy reflected off or diffracted by test structures in the flume.

Although many of the Figures of the drawings only show a total of 5, 6, 8, 11 elements in one absorber, it is to be understood that an absorber could have up to twenty elements or more depending on the specific conditions to be satisfied.

We claim:

1. A water wave absorption device comprising a plurality of absorption elements each formed from at least one sheet of unflattened expanded material having louvred apertures, the elements being positioned one behind the other in spaced relationship and arranged in generally decreasing porosity from the front to the rear of the device.

2. A device as claimed in claim 1 in which said louvred apertures are oriented with the louvres directed upwardly and forwardly in each sheet.

3. A device as claimed in claim 1 located in front of an impervious wall.

4. A device as claimed in claim 3 in which the lower porosity elements near the rear of the device are located in the vicinity of the wave nodal points, substantially one quarter of the wave lengths in front of said impervious wall for the waves that are to be absorbed.

5. A device as claimed in claim 1 in which each element comprises a plurality of sheets arranged substantially end to end and the sheets in each element being arranged generally parallel to corresponding sheets in a next adjacent element.

6. A device as claimed in claim 5 in which the elements are arranged in a zig-zag configuration when viewed in plan.

7. A device as claimed in claim 5 in which a plurality of secondary elements each formed from at least one sheet of unflattened expanded material having louvred apertures, are arranged substantially perpendicular to, and between at least some of said elements.

8. A device as claimed in claim 1 in which at least one of the sheets in at least one element is of generally decreasing porosity from the top to the bottom of the sheet.

9. A device as claimed in claim 1 in which the spacing between successive elements generally decreases from the front to the rear of the device.

10. A device as claimed in claim 1 in which at least some of the elements are essentially vertical.

11. A device as claimed in claim 1 in which at least some of the elements are covered with a sloping or curved cover member extending upwardly towards the rear of the device.

12. A device as claimed in claim 11 in which at least some of the covered elements are essentially vertical, the vertical heights of the covered elements generally increasing towards the rear of the device.

13. A device as claimed in claim 11 in which said cover member extends upwardly from the bottom and is porous.

14. A device as claimed in claim 11 located in a water wave tank and adjustable in the vertical position.

15. A device as claimed in claim 1 provided with floatation means and means for mooring said device.

16. A device as claimed in claim 1 in which the spacing between and behind elements of higher porosity is greater than the spacing between and behind elements of lower porosity.

17. A device as claimed in claim 1 having a distance from front to rear of from about 0.35 $L_{max}$ to 1.0 $L_{max}$, where $L_{max}$ is the length of the longest wave to be absorbed.

* * * * *